US011053408B2

(12) United States Patent
Miyawaki

(10) Patent No.: US 11,053,408 B2
(45) Date of Patent: Jul. 6, 2021

(54) RESIN COMPOSITION FOR DAMPING MATERIAL

(71) Applicant: NIPPON SHOKUBAI CO., LTD., Osaka (JP)

(72) Inventor: Yukihiro Miyawaki, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 167 days.

(21) Appl. No.: 15/515,011

(22) PCT Filed: Sep. 29, 2015

(86) PCT No.: PCT/JP2015/077535
§ 371 (c)(1),
(2) Date: Mar. 28, 2017

(87) PCT Pub. No.: WO2016/052516
PCT Pub. Date: Apr. 7, 2016

(65) Prior Publication Data

US 2017/0210935 A1 Jul. 27, 2017

(30) Foreign Application Priority Data

Sep. 30, 2014 (JP) ............................ JP2014-202238

(51) Int. Cl.

| | |
|---|---|
| ***C09D 5/00*** | (2006.01) |
| ***C08F 2/22*** | (2006.01) |
| ***C08L 33/12*** | (2006.01) |
| ***C08L 97/00*** | (2006.01) |
| ***C09K 3/00*** | (2006.01) |
| ***F16F 15/02*** | (2006.01) |
| ***C09D 133/06*** | (2006.01) |
| ***F16F 1/02*** | (2006.01) |
| ***F16F 1/36*** | (2006.01) |
| ***C09D 5/02*** | (2006.01) |
| *C08K 3/26* | (2006.01) |

(52) U.S. Cl.
CPC ............ *C09D 133/062* (2013.01); *C08F 2/22* (2013.01); *C08L 33/12* (2013.01); *C08L 97/005* (2013.01); *C09D 5/00* (2013.01); *C09D 5/028* (2013.01); *C09K 3/00* (2013.01); *F16F 1/024* (2013.01); *F16F 1/3605* (2013.01); *C08K 2003/265* (2013.01); *C08L 2201/52* (2013.01); *C08L 2201/54* (2013.01)

(58) Field of Classification Search
CPC ...... C09D 133/062; C09D 5/00; C09D 5/028; C08F 2/22; C08L 33/12; C08L 97/00; C08L 97/005; C08L 2201/52; C08L 2201/54; C09K 3/00; F16F 9/006; F16F 15/02; C08K 2003/265
USPC .......................................................... 524/34
See application file for complete search history.

(56) References Cited

U.S. PATENT DOCUMENTS

| | | | | |
|---|---|---|---|---|
| 3,931,448 | A | 1/1976 | Parkinson | |
| 5,188,665 | A * | 2/1993 | Schilling | C08H 6/00 106/123.13 |
| 2003/0207990 | A1 | 11/2003 | Morihiro et al. | |
| 2006/0140688 | A1 * | 6/2006 | Kinpara | B29C 44/18 399/328 |
| 2013/0210967 | A1 | 8/2013 | Krueger et al. | |

FOREIGN PATENT DOCUMENTS

| | | | | |
|---|---|---|---|---|
| CN | 102533019 | A | * | 7/2012 |
| CN | 102618020 | A | * | 8/2012 |
| CN | 102888159 | A | * | 1/2013 |
| CN | 103421399 | A | * | 12/2013 |
| CN | 103694784 | A | * | 4/2014 |
| CN | 103756453 | | | 4/2014 |
| CN | 103992062 | A | * | 8/2014 |
| GB | 1346959 | | | 2/1974 |
| JP | 57-016070 | | | 1/1982 |
| JP | 57016070 | A | * | 1/1982 |
| JP | 2-150445 | | | 6/1990 |
| JP | 6-145454 | | | 5/1994 |
| JP | 7-146686 | | | 6/1995 |
| JP | 07146686 | A | * | 6/1995 |
| JP | 2003-193025 | | | 7/2003 |
| JP | 2011-240224 | | | 12/2011 |

OTHER PUBLICATIONS

Translation of JP 57016070 to Seiji Sumida Et Al. (1982).*
Translation of JP 07146686 to Ryusuke Kono (1995).*
Chen, et al., "Physical Properties of Lignin-Based Polypropylene Blends", Polymer Composites, 2011, 32(7), pp. 1019-1025.

* cited by examiner

*Primary Examiner* — Kelechi C Egwim
(74) *Attorney, Agent, or Firm* — Hamre, Schumann, Mueller & Larson, P.C.

(57) ABSTRACT

Provided is a vibration damping composite capable of providing a vibration damping material, at low cost, that exhibits a high vibration damping property in a wide temperature range and has excellent appearance. The present invention relates to a resin composition for vibration damping materials which contains a lignin and/or a lignin derivative. The present invention also relates to a vibration damping composite containing the resin composition for vibration damping materials and an inorganic pigment. The present invention also relates to a vibration damping material obtainable from the vibration damping composite.

19 Claims, No Drawings

RESIN COMPOSITION FOR DAMPING MATERIAL

TECHNICAL FIELD

The present invention relates to a resin composition for vibration damping materials. More specifically, the present invention relates to a resin composition for vibration damping materials suitable for a variety of structures which are required to have a vibration damping property, a vibration damping composite containing the resin composition for vibration damping materials, and a vibration damping material obtainable from the vibration damping composite.

BACKGROUND ART

Vibration damping materials are used to prevent vibration or noise of various structures to insure sustained quietude, and are widely used for, for example, underfloor spaces of automobile interior, or for railway vehicles, ships, aircraft, electric devices, buildings, or construction machinery. Vibration damping materials which have been conventionally used are plate- or sheet-like molded products made from materials having vibration absorbing performance and sound absorbing performance. As an alternative to such molded products, coating type vibration damping composites have been proposed which can absorb vibration and sound in the form of a coating (see, for example, Patent Literature documents 1 to 3).

Lignin is a natural aromatic polymer present in the trees, and is rich in waste liquor from the production of kraft pulp (kraft pulp waste liquor) and waste liquor from the production of sulfite pulp (sulfite pulp waste liquor). For example, kraft lignin, which is contained in kraft pulp waste liquor, sulfomethylated with a sulfite and formaldehyde, and lignin sulfonic acid or a salt thereof, which is contained in sulfite pulp waste liquor, partly desulfonated or purified by ultrafiltration have been used as dispersants in the field of dye, cement, inorganic and organic pigments, plaster, coal-water slurry, agrochemicals, or ceramic (see, for example, Patent Literature 4).

CITATION LIST

Patent Literature

Patent Literature 1: JP 2003-193025 A
Patent Literature 2: JP H06-145454 A
Patent Literature 3: JP H02-150445 A
Patent Literature 4: JP 2011-240224 A

SUMMARY OF INVENTION

Technical Problem

Although a variety of vibration damping composites have been proposed as described above, vibration damping composites capable of providing vibration damping materials, at low cost, that exhibit a high vibration damping property in a wide temperature range and have excellent appearance still have not been produced yet.

The present invention has been made in view of the state of the art described above, and aims to provide a vibration damping composite capable of providing a vibration damping material, at low cost, that exhibits a high vibration damping property in a wide temperature range and has excellent appearance.

Solution to Problem

The present inventor has focused on less costly, readily available and environmentally preferred plant-derived components which have not been blended as materials to conventional resin compositions for vibration damping materials, and have performed various studies on them. As a result, the present inventor has found a new resin composition for vibration damping materials which contains a lignin and/or a lignin derivative. The present inventor has found that this resin composition for vibration damping materials can provide a vibration damping material that exhibits a remarkably high vibration damping property in a wide temperature range and has remarkably good appearance in which peeling and cracking are suppressed. Thus, the present inventor solved the above problems, thereby completing the present invention.

That is, the present invention relates to a resin composition for vibration damping materials which contains a lignin and/or a lignin derivative.

The present invention also relates to a vibration damping composite containing the resin composition for vibration damping materials of the present invention and an inorganic pigment.

The present invention also relates to a vibration damping material obtainable from the vibration damping composite of the present invention.

The present invention is described in more detail below.

Any combination of two or more of the following preferred embodiments according to the present invention is also a preferred embodiment according to the present invention.

<Resin Composition for Vibration Damping Materials of the Present Invention>

The resin composition for vibration damping materials of the present invention contains a lignin and/or a lignin derivative, and preferably further contains a resin other than the lignin and the lignin derivative. The resin composition for vibration damping materials of the present invention can provide a vibration damping material that exhibits a remarkably high vibration damping property in a wide temperature range and has excellent appearance.

Lignin is one of the three major components (cellulose, hemicellulose, lignin) of plant-derived biomass such as woods, most abundantly present on the earth among natural aromatic polymers, and readily available at low cost. Therefore, lignin is advantageously used to prepare the resin composition for vibration damping materials of the present invention. Further, since the resin composition for vibration damping materials of the present invention can use a lignin and a derivative thereof which is a plant-derived component and is produced in large amounts as by-products in the paper and pulp industry, the resin composition is highly preferred from an environmental viewpoint.

(A Lignin and/or a Lignin Derivative)

The lignin refers to unmodified lignin, and may be, for example, natural lignin present in plant bodies or lignin as isolated from plant bodies by digestion. Lignin as isolated from plant bodies by digestion may contain a thioether bond or a substituent such as a sulfonic acid group, a sulfonate group, or an acetyl group. The term “modified” herein refers to introduction of a structure site different from the structure sites of lignin as isolated from plant bodies by digestion into the lignin. The lignin and the lignin derivative refer to one having a phenylpropane skeleton, which is a basic skeleton of lignin.

The lignin is preferably kraft lignin containing a thioether bond in the structure or lignin sulfonic acid (salt). In particular, lignin sulfonic acid (salt) is more preferred because it can improve the vibration damping property in a wide temperature range in a balanced manner. The lignin sulfonic acid (salt) herein means a lignin sulfonic acid and/or a lignosulfonate.

The lignosulfonate may be, for example, a monovalent metal salt, a divalent metal salt, an ammonium salt, an organic amine salt, or a mixture of these salts.

The lignin may also be obtained by decomposition or molecular weight fractionation of the lignin sulfonic acid (salt). Examples of the decomposition include hydrolysis. The molecular weight fractionation may be performed, for example, by ultrafiltration. In particular, hydrolysis is preferred.

The lignin is more preferably lignin sulfonic acid, sodium lignosulfonate, magnesium lignosulfonate, or calcium lignosulfonate, still more preferably sodium lignosulfonate, magnesium lignosulfonate, or calcium lignosulfonate, particularly preferably magnesium lignosulfonate or calcium lignosulfonate, most preferably magnesium lignosulfonate because they can sufficiently enhance the function of the resulting vibration damping material.

The lignin may be lignin as isolated from plant bodies by digestion as described above. Specifically, for example, kraft pulp waste liquor or sulfite pulp waste liquor may be used as it is as the lignin. Although kraft lignin, contained in kraft pulp waste liquor, and lignin sulfonic acid, contained in sulfite pulp waste liquor, are usually different in physical properties, but they can both exhibit the effects of the present invention in the resin composition for vibration damping materials as described in the examples of the present application.

Another example of the lignin may be waste liquor from alkaline digestion (alkali lignin), waste liquor by an acetic acid method (acetic acid lignin), waste liquor obtained using an aqueous organic solvent as digestion liquor (organosoluble lignin), or waste liquor obtained by steam explosion (exploded lignin).

The alkaline digestion is preferably a method of digesting woody plants using an alkali metal hydroxide such as sodium hydroxide (caustic soda).

The lignin may be one prepared by appropriately adjusting the solids concentration of any of the above waste liquors. The solids concentration of the waste liquor is, for example, 10% to 70% by mass, preferably 15% to 45% by mass.

A common digestive aid may be used in the preparation of the lignin.

The lignin may be digestion liquor from the production of pulp from a plant as it is or with the solids concentration thereof being appropriately adjusted, as described above. The lignin may also be a product obtained by purification of digestion liquor (e.g. commercial products). The purification of digestion liquor may be carried out by a common method. For example, the pH of digestion liquor is adjusted to a predetermined value by addition of an acid, and a lignin is precipitated. Examples of commercial products of refined lignosulfonate from digestion liquor include PEARLLEX NP (sodium lignosulfonate, produced by Nippon Paper Industries Co., Ltd.), SAN X P321 (magnesium lignosulfonate, produced by Nippon Paper Industries Co., Ltd.), PEARLLEX CP (calcium lignosulfonate, produced by Nippon Paper Industries Co., Ltd.), and a solution prepared by adding an aqueous solvent to any of these and appropriately adjusting the solids concentration thereof. The preferred range of the solids concentration is the same as the above preferred range of the solids concentration of the waste liquor.

The lignin derivative refers to modified lignin, which is derivatized one of the lignin such as lignin sulfonic acid (salt). The term "derivatized" corresponds to the term "modified" herein, and means introduction of a structure site different from the structure sites of lignin as isolated from plant bodies by digestion into the lignin. Examples of the derivatization include alkylation, amination, alkoxylation, alkoxy sulfonylation, sulfoalkylation, amino alkylation, desulfonation, and addition of any substituent to be mentioned later, such as carboxyl group-containing groups and (poly)alkylene glycol chain-containing groups.

The lignin derivative may have a structure represented by the following formula (1):

(1)

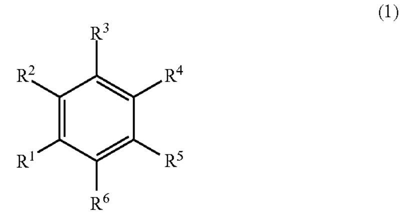

wherein $R^1$ to $R^6$ are the same as or different from one another, and each represent a hydrogen atom, a hydroxy group, an alkoxy group, an acyl group, an amino group, a sulfonic acid group, a sulfonate group, a carboxyl group-containing group, a (poly)alkylene glycol chain-containing group, a hydrocarbon group, a direct bond or a thioether bond with a structure derived from another phenylpropane skeleton; at least one of $R^1$ to $R^6$ represents a direct bond or a thioether bond with a structure derived from another phenylpropane skeleton; and at least one of $R^1$ to $R^6$ represent an alkoxy group, a carboxyl group-containing group, a (poly)alkylene glycol chain-containing group, or a hydrocarbon group.

The (poly)alkylene glycol chain-containing group may be a group consisting only of a (poly)alkylene glycol chain or a group containing a (poly)alkylene glycol chain and other structure site(s). Examples of the other structure site(s) include a hydrocarbon group such as an aliphatic hydrocarbon group or an aromatic hydrocarbon group. The (poly)alkylene glycol chain-containing group is preferably a group consisting only of a (poly)alkylene glycol chain or a group in which a (poly)alkylene glycol chain is added to an aromatic ring having a C1-C30 alkylene group.

The (poly)alkylene glycol chain may have any end structure, and may have a substituent at an end. A hydrogen atom or a hydrocarbon group is preferably bonded to an oxygen atom present at an end. The hydrocarbon group is preferably a C1-C2 alkyl group.

The (poly)alkylene glycol chain preferably mainly includes a C2-C4 alkylene oxide such as ethylene oxide, propylene oxide, or butylene oxide, and more preferably mainly includes ethylene oxide.

The term "mainly" herein means that when a polyalkylene glycol site includes two or more different alkylene oxides, one of the alkylene oxides accounts for preferably 50 to 100 mol % of the total number of alkylene oxides.

The average number of moles of alkylene oxide added constituting the (poly)alkylene glycol chain is preferably 3 to 200. The average number of moles of alkylene oxide added means an average of the moles of the alkylene oxide added to a single polyalkylene glycol chain in the lignin.

The alkoxy group is preferably a C1-C15 alkoxy group, more preferably a C1-C2 alkoxy group.

The carboxyl group-containing group may be any group containing a carboxyl group (—COOH) or a salt thereof, and may be a carboxyl group, a salt thereof, or a group containing a carboxyl group or a salt thereof and other structure site(s). Examples of the other structure site(s) include hydrocarbon groups such as aliphatic hydrocarbon groups and aromatic hydrocarbon groups. The carboxyl group-containing group is preferably —COOH, a salt thereof, a C1-C30 aliphatic hydrocarbon group containing a carboxyl group or a salt thereof, or a C1-C20 alkylene group containing an aromatic carboxyl group. The aromatic carboxyl group is an aromatic group containing a carboxyl group or a salt thereof.

The hydrocarbon group is preferably a C1-C30 hydrocarbon group, more preferably a C1-C5 hydrocarbon group.

One or two or more of the hydrogen atoms or other substituents represented by $R^1$ to $R^6$ may be bonded the benzene ring in the lignin skeleton.

The lignin and/or the lignin derivative preferably have/has a weight average molecular weight of 100 to 40,000. The lignin and/or the lignin derivative with such a weight average molecular weight can more sufficiently exert the function of the resulting vibration damping material. The weight average molecular weight is more preferably 500 to 30,000, still more preferably 2,000 to 15,000. The weight average molecular weight can be measured by GPC under the following conditions.

<Measurement Conditions>

Column: A series of columns connected in the order of a TSK guard column a, a TSKgel α-5000, a TSKgel α-4000, and a TSKgel α-3000 (produced by Tosoh Corporation)

Eluent: A solution prepared by dissolving 44.5 g of boric acid in a solution of 1,800 g of acetonitrile and 7141.1 g of water and adjusting the pH to 10.0 with a 30% aqueous solution of NaOH Amount of sample supplied: 100 μL Flow rate: 1.0 mL/min Column temperature: 40° C.

Detector: 2414 Differential refractive index detector produced by Nihon Waters K.K.

Analyzing software: Empower 2 Software produced by Nihon Waters K.K.

Calibration curve reference material: Polyethylene glycol

A 0.5 mass % solution containing a lignin and/or a lignin derivative dissolved in the eluent are/is used as a sample.

The lignin and/or the lignin derivative may be formed from any material, and may be formed from any natural product or any artificial product. In the case of a natural product, the natural product may be formed from any wood, and may be a wood-based product made from a woody plant or a herbaceous-based product made from a herbaceous plant. Examples of the woody plant include needle-leaved trees such as cedar, fir, cypress, and pine, and broad-leaved trees such as *eucalyptus*, acacia, white birch, beech, and oak. Examples of the herbaceous plant include rice straw, cereal grain, bagasse, bamboo, kenaf, and reed.

The lignin and/or the lignin derivative are/is preferably a wood-based product made from woody plant, more preferably a wood-based product made from needle-leaved trees.

<Production Method of a Lignin and/or a Lignin Derivative>

The lignin is obtainable by a conventionally known method.

The method of modifying a lignin with a substituent or the like to obtain the lignin derivative is not particularly limited. For example, a reactive group of the lignin, such as a hydroxy group, may be reacted with a compound having a substituent.

When the substituent is a (poly)alkylene glycol chain-containing group, the lignin can be modified by the process (1) in which a hydroxy group of the lignin is reacted with an alkylene oxide such as ethylene oxide or a compound having a (poly)alkylene glycol chain, or the process (2) in which a compound having a (poly)alkylene glycol chain is reacted with an aldehyde compound, and then the lignin is added to and reacted with the resulting reaction product.

The process (1) produces modified lignin in which a phenolic hydroxy group of the lignin is directly bonded to the (poly) alkylene oxide or the compound having a (poly) alkylene glycol chain, and the process (2) produces modified lignin in which the benzene ring of the lignin is bonded to the compound having a (poly)alkylene glycol chain via a divalent linking group.

Examples of the compound having a (poly)alkylene glycol chain in the process (1) include polyalkylene glycol compounds such as polyethylene glycol and polypropylene glycol; a monofunctional glycidyl ether compound such as polyethylene glycol monoethyl glycidyl ether, polyethylene glycol monomethyl glycidyl ether, or lauryl alcohol polyethylene oxide glycidyl ether; a bifunctional glycidyl ether compound such as poly(ethylene glycol)diglycidyl ether or poly(propylene glycol)diglycidyl ether; a glycidyl ether compound prepared by reaction of the glycidyl group (hereinafter, also referred to as epoxy group) of these compounds with an alkoxide compound such as methoxy or ethoxy in which the functionality of the glycidyl ether group is reduced; a monofunctional epoxy polyalkylene glycol compound prepared by reaction of an alkoxy polyalkylene glycol such as methoxypolyethylene glycol with an epihalohydrin such as epichlorohydrin; and methoxypolyethylene glycol acrylate.

Examples of the compound having a (poly)alkylene glycol chain in the process (2) include an aromatic (poly) alkylene glycol compound such as an ethylene oxide adduct of a phenol.

When the substituent is a carboxyl group-containing group, the lignin can be modified, for example, by reacting a carboxyl group-containing compound with an aldehyde compound and adding the lignin thereto to react with the resulting reaction product.

This reaction produces modified lignin in which the benzene ring of the lignin is bonded to the carboxyl group-containing compound via a divalent linking group.

Examples of the carboxyl group-containing compound include aromatic carboxylic acid compounds such as 2-hydroxyphenyl acetic acid.

Alternately, the lignin derivative may be produced (synthesized) by reaction of lignin sulfonic acid (salt) and a water-soluble unsaturated monomer such as acrylic acid or methoxypolyethylene glycol acrylate. For example, a functional group (e.g. phenolic hydroxyl group, alcoholic hydroxyl group, thiol group) of the lignin sulfonic acid (salt) is chemically reacted with a water-soluble unsaturated monomer. The mode of the reaction is, for example, radical polymerization or ionic polymerization. Specifically, for example, a radical initiator is made to act on the lignin sulfonic acid (salt) to abstract a hydrogen radical, and at least one type of water-soluble unsaturated monomer is radical polymerized at a site where the hydrogen radical produces. Thus, a lignin derivative can be obtained. The reaction product may be further crosslinked using formaldehyde or a polyfunctional cross-linking agent, and the resulting product can be used as a lignin derivative.

The amount of the lignin and/or the lignin derivative are/is preferably 1% by mass or more, more preferably 3% by mass or more, still more preferably 5% by mass or more, particularly preferably 7% by mass or more, most preferably 9% by mass or more of 100% by mass of the solids content of the resin composition for vibration damping materials of the present invention. The amount is preferably 80% by mass or less, more preferably 70% by mass or less, still more preferably 60% by mass or less, particularly preferably 50% by mass or less.

The solids herein refer to components excluding solvents such as aqueous solvents.

(Resin)

A variety of resins that are miscible with the lignin and/or the lignin derivative may be used as the resin. For example, the resin preferably contains at least one polymer selected from the group consisting of (meth)acrylic polymers, diene polymers, and vinyl acetate polymers.

The (meth)acrylic polymers have only to be the below described polymers having a structural unit derived from a (meth)acrylic monomer, and are preferably polymers having a structural unit derived from a (meth)acrylic acid monomer.

For example, a monomer component for producing the (meth)acrylic polymer preferably includes a (meth)acrylic acid monomer and other copolymerizable unsaturated monomer(s). The (meth)acrylic acid monomer improves the dispersibility of an inorganic pigment and the like in the vibration damping composite containing the resin composition for vibration damping materials of the present invention. Thereby, the function of the resulting vibration damping material is further enhanced. Furthermore, addition of the other copolymerizable unsaturated monomer(s) enables easy adjustment of the acid value, Tg, physical properties, and the like, of the polymer.

The (meth)acrylic acid monomer is a monomer containing at least one group selected from an acryloyl group, a methacryloyl group, and a group obtained by replacing a hydrogen atom in either of these groups with another atom or an atomic group, and the carbonyl group of the at least one group forms a carboxyl group (—COOH group) or an acid anhydride group (—C(═O)—O—C(═O)— group). The (meth)acrylic acid monomer is preferably (meth)acrylic acid.

The (meth)acrylic polymer is preferably prepared by, for example, copolymerization of a monomer component composed of 0.1% to 5% by mass of the (meth)acrylic acid monomer and 95% to 99.9% by mass of the other copolymerizable unsaturated monomer(s). The monomer component is composed of more preferably 0.3% by mass or more of the (meth)acrylic acid monomer and 99.7% by mass or less of the other copolymerizable unsaturated monomer(s), still more preferably 0.5% by mass or more of the (meth) acrylic acid monomer and 99.5% by mass or less of the other copolymerizable unsaturated monomer(s), particularly preferably 0.7% by mass or more of the (meth)acrylic acid monomer and 99.3% by mass or less of the other copolymerizable unsaturated monomer(s). The monomer component is composed of preferably 5% by mass or less of the (meth)acrylic acid monomer and 95% by mass or more of the other copolymerizable unsaturated monomer(s), more preferably 4% by mass or less of the (meth)acrylic acid monomer and 96% by mass or more of the other copolymerizable unsaturated monomer(s), still more preferably 3% by mass or less of the (meth)acrylic acid monomer and 97% by mass or more of the other copolymerizable unsaturated monomer(s). The monomer component with the above described composition can be stably copolymerized.

Examples of the other copolymerizable unsaturated monomer(s) include (meth)acrylic monomers other than the (meth)acrylic acid monomer, aromatic ring-containing unsaturated monomers, and other copolymerizable unsaturated monomers.

The (meth)acrylic monomers other than the (meth)acrylic acid monomer refer to monomers that contain an acryloyl group, a methacryloyl group, or a group obtained by replacing a hydrogen atom in either of these groups with another atom or an atomic group, and contain an ester of a carboxyl group or a salt of a carboxyl group; or refer to derivatives of the monomers.

Examples of the (meth)acrylic monomers other than the (meth)acrylic acid monomer include methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, vinyl formate, vinyl acetate, vinyl propionate, 2-hydroxyethyl acrylate, 2-hydroxyethyl methacrylate, 2-hydroxypropyl acrylate, 2-hydroxypropyl methacrylate, diallyl phthalate, triallyl cyanurate, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, and allyl methacrylate; and salts or esterified products of (meth)acrylic acid monomers other than these listed above. One or more of these may be preferably used.

Preferred examples of the salts of the (meth)acrylic acid monomer include metal salts, ammonium salts, and organic amine salts. Preferred examples of a metal atom contained in the metal salts include monovalent metal atoms such as alkali metal atoms (e.g. lithium, sodium, potassium); divalent metal atoms such as calcium and magnesium; and trivalent metal atoms such as aluminum and iron. Preferred examples of the organic amine salts include alkanolamine salts such as an ethanolamine salt, a diethanolamine salt, and a triethanolamine salt; and a triethylamine salt.

The monomer component for producing the (meth)acrylic polymer contains the (meth)acrylic monomer other than the (meth)acrylic acid monomer in an amount of preferably 20% by mass or more, more preferably 40% by mass or more, still more preferably 60% by mass or more based on 100% by mass of the entire monomer component. The monomer component contains the (meth)acrylic monomer other than the (meth)acrylic acid monomer in an amount of preferably 99.9% by mass or less, more preferably 99.5% by mass or less, still more preferably 99% by mass or less, further preferably 90% by mass or less, particularly preferably 85% by mass or less based on 100% by mass of the entire monomer component.

Examples of the aromatic ring-containing unsaturated monomers include divinylbenzene, styrene, α-methylstyrene, vinyl toluene, and ethyl vinyl benzene. Preferred is styrene.

That is, an embodiment in which the (meth)acrylic polymer is a styrene-(meth)acrylic polymer obtained from a monomer component containing styrene is also one preferred embodiment of the present invention. Such an embodiment enables cost reduction and sufficient exhibition of the effects of the present invention.

If the monomer component for producing the (meth) acrylic polymer contains the aromatic ring-containing unsaturated monomer, the amount thereof is preferably 1% by mass or more, more preferably 5% by mass or more, still more preferably 10% by mass or more, particularly preferably 15% by mass or more based on 100% by mass of the entire monomer component. Further, the monomer component contains the aromatic ring-containing unsaturated monomer in an amount of preferably 80% by mass or less, more preferably 70% by mass or less, still more preferably 60% by mass or less, particularly preferably 40% by mass or less based on 100% by mass of the entire monomer component. The monomer component for producing the (meth) acrylic polymer may not include the aromatic ring-containing unsaturated monomer.

Examples of the other copolymerizable unsaturated monomer(s) include polyfunctional unsaturated monomers such as acrylonitrile and trimethylolpropane diallyl ether.

The diene polymers in the resin composition for vibration damping materials of the present invention are obtained by polymerization of a monomer component containing a diene monomer. The diene monomer has only to be a monomer that has two double bonds, and the two double bonds are preferably separated by a single bond.

The diene monomer preferably has 4 to 18 carbon atoms, more preferably 4 to 12 carbon atoms, still more preferably 4 to 8 carbon atoms, and is particularly preferably butadiene.

The diene polymer is preferably obtained by, for example, copolymerization of a monomer component composed of 5% to 70% by mass of the diene monomer and 30% to 95% by mass of the other copolymerizable unsaturated monomer (s).

The other copolymerizable unsaturated monomer(s), which is/are a raw material of the diene polymer, is/are not particularly limited, and examples thereof include the above described (meth)acrylic monomers other than the (meth) acrylic acid monomer, aromatic ring-containing unsaturated monomers, and other copolymerizable unsaturated monomer(s). Preferred examples thereof are the same as those described above. For example, the (meth)acrylic monomer other than the (meth)acrylic acid monomer is preferably methyl methacrylate, the aromatic ring-containing unsaturated monomer is preferably styrene, and the other copolymerizable unsaturated monomer(s) is/are preferably acrylonitrile. Preferred examples of the diene polymer include acrylonitrile-butadiene rubber (NBR), methyl methacrylate-butadiene rubber (MBR), and styrene-butadiene rubber (SBR). One or more of these may be usable.

Herein, with respect to the polymer in the resin composition for vibration damping materials of the present invention, a polymer containing at least one structure derived from a (meth)acrylic acid monomer is referred to as a (meth)acrylic polymer even if it contains at least one structure derived from a diene monomer in the structure, while a polymer containing at least one structure derived from a diene monomer and no structure derived from a (meth) acrylic acid monomer in the structure is referred to as diene polymers.

The diene polymer preferably has a SP value of 6 or more, more preferably 7 or more, still more preferably 8 or more for better compatibility with solvents and the resulting effects on the formation of a coating. The SP value is preferably 12 or less, more preferably 11 or less, still more preferably 10 or less, particularly preferably 9 or less.

The SP value of the diene polymer is calculated according to the method of Fedors (Polymer Eng. Sci., 14, No. 2, 147, 1974) and Tortorello et al. (J. Coat. Technol., 55, 696, 99, 1983).

$$\delta=[(\Sigma\Delta e_1)(x)/(\Sigma\Delta V_m)(x)]^{0.5}$$

In the formula, δ represents a SP value of the polymer, $\Delta e_1$ represents calculated evaporation energy (kcal/mol) of each of the monomers that constitute the polymer, $\Sigma\Delta e_1$ represents the sum of the calculated evaporation energy values of all the monomers that constitute the polymer, $\Delta V_m$ represents a calculated molecular volume (ml/mol) of each of the monomers that constitute the polymer, $\Sigma\Delta V_m$ represents the sum of the calculated molecular volume values of all the monomers that constitute the polymer, and x represents molar distribution of each of the monomers that constitute the polymer.

The evaporation energy and molecular volume of each monomer may be calculated values commonly used.

Thus, the SP value of the diene polymer can be adjusted by adjusting the kinds of the constituent monomers and the composition ratio of the monomers.

The vinyl acetate polymer in the resin composition for vibration damping materials of the present invention is prepared by polymerization of a monomer component containing vinyl acetate. The vinyl acetate polymer is preferably prepared by polymerization of a monomer component containing 50% by mass or more of vinyl acetate. The monomer component for producing the vinyl acetate polymer may contain any monomer in addition to vinyl acetate, and examples thereof include the above described (meth)acrylic monomers other than the (meth)acrylic acid monomer, aromatic ring-containing unsaturated monomers, and other copolymerizable unsaturated monomers.

Herein, with respect to the polymer in the resin composition for vibration damping materials of the present invention, a polymer containing at least one structure derived from a (meth)acrylic acid monomer is referred to as a (meth)acrylic polymer even if it contains at least one structure derived from a vinyl acetate monomer in the structure, a polymer containing at least one structure derived from a diene monomer and no structure derived from a (meth) acrylic acid monomer is referred to as a diene polymer even if it contains at least one structure derived from a vinyl acetate monomer in the structure, and a polymer containing at least one structure derived from a vinyl acetate monomer, no structure derived from a (meth)acrylic acid monomer, and no structure derived from a diene monomer in the structure is referred to as a vinyl acetate polymer.

The resin composition for vibration damping materials of the present invention includes an aqueous solvent, and the resin is preferably dispersed or dissolved in the aqueous solvent. The phrase "the resin is dispersed in the aqueous solvent" herein means that the resin is not dissolved but dispersed in the aqueous solvent. Herein, the aqueous solvent may contain other organic solvent(s) as long as the aqueous solvent contains water. The aqueous solvent is preferably water.

The polymer according to the present invention is preferably an emulsion prepared by emulsion polymerization of a monomer component. That is, the resin in the resin composition for vibration damping materials of the present invention preferably contains an emulsion prepared by emulsion polymerization of a monomer component.

The resin composition for vibration damping materials of the present invention may include one or two or more polymers (hereinafter, also referred to as polymers according to the present invention) selected from the group consisting of the (meth)acrylic polymers, the diene polymers, and the vinyl acetate polymers. When the resin composition for vibration damping materials of the present invention includes two or more of the polymers according to the present invention, the polymers according to the present invention may be in the form of a mixture obtained by mixing (blending) them, or may be in the form of a polymer composite of the two or more polymers which is obtained in a series of production steps to produce a composite of the two or more polymers (e.g. multistage polymerization). The substance containing the two or more polymers can be obtained in the series of production steps by appropriately setting the production conditions such as conditions for dropwise addition of monomers. The composite of the two or more polymers may have, for example, a core part and a shell part as described below. When the polymers according to the present invention have a core part and a shell part, the polymers according to the present invention may consist of two of the polymers according to the present invention, and one polymer forms a core part and the other forms a shell part, for example. Here, when the (meth)acrylic polymer is formed from a monomer component that contains a (meth) acrylic acid monomer, the (meth)acrylic acid monomer may be contained in a core-forming monomer component or a shell-forming monomer component in an emulsion, or may be contained both in a core-forming monomer component and a shell-forming monomer component, for example.

At least one of the polymers according to the present invention in the emulsion may be in the form of emulsion particles having a core part and a shell part. By using the polymer, the interface between the polymers according to the present invention can be increased to enhance the effects of improving the vibration damping property of the resulting vibration damping material.

When the emulsion contains emulsion particles having a core part and a shell part, the emulsion particles may have a homogeneous structure in which the core part and the shell part are completely blended with each other and therefore they cannot be distinguished from each other, or a core-shell composite structure or a microdomain structure, in which the core part and the shell part are not completely blended with each other and inhomogeneously formed. Among these structures, the core-shell composite structure is preferred for production of a stable emulsion with sufficient performance as an emulsion.

The emulsion with a core-shell composite structure exhibits a high vibration damping property in a wide practical temperature range, and also exhibits a high vibration damping property than resin compositions for vibration damping materials with other structures particularly in a higher temperature range. Thus, the emulsion with a core-shell composite structure can exhibit a vibration damping property in a wide practical temperature range from room temperature to a high temperature range.

In the core-shell composite structure, a core part surface is preferably covered with a shell part. In this case, the core part surface is preferably completely covered with the shell part, but may not be completely covered therewith. For example, the core part surface may be covered in a mesh pattern or may be partly exposed.

The polymer according to the present invention preferably has a glass transition temperature of −20° C. to 40° C. Use of the polymer according to the present invention having such a glass transition temperature can effectively impart the vibration damping performance in the practical temperature range of the vibration damping material. The glass transition temperature of the polymer according to the present invention is more preferably −15° C. to 35° C., still more preferably −10° C. to 30° C.

The glass transition temperature (Tg) can be calculated by the method disclosed in the below described examples. When at least one of the polymers according to the present invention is prepared by multistage polymerization (e.g. in the form of emulsion particles having a core part and a shell part), the glass transition temperature means Tg (total Tg) calculated from the composition of the monomers used in all the stages.

When at least one of the polymers according to the present invention is in the form of emulsion particles having a core part and a shell part, the glass transition temperature of the polymer as a core part is preferably 0° C. to 60° C., more preferably 10° C. to 50° C.

The glass transition temperature of the polymer as a shell part is preferably −30° C. to 30° C., more preferably −20° C. to 20° C.

The difference in glass transition temperature between the polymer as a core part and the polymer as a shell part is preferably 5° C. to 60° C. When a polymer having such a difference in glass transition temperature is used for, for example, a vibration damping material, a higher vibration damping property can be achieved in a wide temperature range. In particular, the vibration damping property can be further improved in a practical range of from 20° C. to 60° C. The difference in glass transition temperature is more preferably 10° C. to 50° C., still more preferably 20° C. to 40° C.

When at least one of the polymers according to the present invention is in the form of emulsion particles having a core part and a shell part, the mass ratio of the core-forming monomer component to the shell-forming monomer component (core-forming monomer component/shell-forming monomer component) is preferably 30/70 to 70/30. The polymer having such a mass ratio can exhibit the effects obtained from a core-shell structure more sufficiently. The mass ratio of the core-forming monomer component to the shell-forming monomer component is more preferably 40/60 to 60/40.

The polymer according to the present invention preferably has a weight average molecular weight of 20,000 to 800,000. In order to exhibit the vibration damping property, it is preferred to convert the energy due to vibration applied to the polymer into frictional thermal energy, and the polymer needs to be movable when vibration is applied thereto. The polymer according to the present invention having such a weight average molecular weight can sufficiently move when vibration is applied thereto, and thus can exhibit a high vibration damping property. The weight average molecular weight of the polymer according to the present invention is more preferably 30,000 to 400,000.

The weight average molecular weight (Mw) can be measured using GPC under the conditions disclosed in the below described examples.

The emulsion particles in the emulsion of the polymer according to the present invention preferably have an average particle size of 80 to 450 nm.

Use of the emulsion particles having an average particle size in the above range can achieve a higher vibration damping property as well as sufficient basic performance required for the vibration damping material, such as the appearance of a coating or coating formability. The average particle size of the emulsion particles is more preferably 400 nm or smaller, still more preferably 350 nm or smaller. The average particle size is preferably 100 nm or greater.

The average particle size of the emulsion particles can be measured by the method disclosed in the below described examples.

The emulsion particles with an average particle size in the above range have a particle size distribution, which is defined as a value obtained by dividing a standard deviation by the volume average particle size thereof (standard deviation/volume average particle size×100), of preferably 40% or less, more preferably 30% or less. The emulsion particles having a particle size distribution of 40% or less may not contain coarse particles. As a result, the resin composition for vibration damping materials can exhibit sufficient heat-drying property.

The solids content of the emulsion is preferably 40% to 80% by mass, more preferably 50% to 70% by mass, of the entire emulsion.

The solids herein refer to components contained in the emulsion, excluding solvents such as aqueous solvents.

The pH of the emulsion is not particularly limited, and is preferably 2 to 10, more preferably 3 to 9.5, still more preferably 7 to 9. The pH of the emulsion can be adjusted by adding ammonia water, a water-soluble amine, an alkali hydroxide aqueous solution, or the like, to the resin.

The pH herein can be measured by the method disclosed in the below described examples.

The viscosity of the emulsion is not particularly limited, and is preferably 1 to 10,000 Pa·s, more preferably 5 to 9,000 Pa·s, still more preferably 10 to 8000 Pa·s, further more preferably 100 to 7,000 mPa·s, still further more preferably 300 to 6,000 Pa·s, particularly preferably 500 to 5,000 Pa·s, more particularly preferably 800 to 4,500 Pa·s, further more particularly preferably 900 to 4,000 Pa·s, most preferably 1,000 to 3,500 Pa·s.

The viscosity herein can be measured under the conditions disclosed in the below described examples.

The emulsion may be produced by any method. For example, the emulsion can be produced by the same method as the production method of emulsion for vibration damping materials disclosed in JP 2011-231184 A.

The solids content of the polymer (preferably emulsion) according to the present invention is preferably 20% by mass or more, more preferably 30% by mass or more, still more preferably 40% by mass or more, particularly preferably 50% by mass or more of 100% by mass of the solids content of the resin composition for vibration damping materials of the present invention. The solids content is preferably 99% by mass or less, more preferably 97% by mass or less, still more preferably 95% by mass or less, particularly preferably 93% by mass or less, most preferably 91% by mass or less.

The solids refer to components, excluding solvents such as aqueous solvents.

As long as the resin composition for vibration damping materials of the present invention contains a lignin and/or a lignin derivative and the resin in the present invention, the resin composition may contain other component(s).

When the resin composition for vibration damping materials of the present invention contains other component(s), the amount of the other component(s) is preferably 10% by mass or less, more preferably 5% by mass or less based on the entire resin composition for vibration damping materials of the present invention. The other component(s) herein refer(s) to a nonvolatile component (solids) left in a coating obtained by applying the resin composition for vibration damping materials of the present invention and heat-drying the composition. The other component(s) does/do not include a volatile component such as an aqueous solvent.

As described above, the resin composition for vibration damping materials of the present invention preferably contains a solvent such as an aqueous solvent.

The amount of the solvent is preferably 3% by mass or more, more preferably 10% by mass or more, still more preferably 20% by mass or more, particularly preferably 30% by mass or more of 100% by mass of the resin composition for vibration damping materials of the present invention. The amount of the solvent is preferably 97% by mass or less, more preferably 90% by mass or less, still more preferably 70% by mass or less, particularly preferably 50% by mass or less.

The resin composition for vibration damping materials of the present invention itself may be applied to form a vibration damping film. Still, it is usually used to obtain the below described vibration damping composite of the present invention.

<Vibration Damping Composite of the Present Invention>

The present invention also relates to a vibration damping composite containing the resin composition for vibration damping materials of the present invention and an inorganic pigment. A preferred resin composition for vibration damping materials contained in the vibration damping composite of the present invention is the same as the above described preferred resin composition for vibration damping materials of the present invention.

The solids content of the resin composition for vibration damping materials is preferably 1% by mass or more, more preferably 5% by mass or more, still more preferably 10% by mass or more of 100% by mass of the solids content of the vibration damping composite of the present invention. Further, the solids content of the resin composition for vibration damping materials is preferably 50% by mass or less, more preferably 40% by mass or less, still more preferably 30% by mass or less.

As the inorganic pigment, one or two or more of inorganic colorants, antirust pigments, fillers, and the like may be used. Examples of the inorganic colorants include titanium oxide, carbon black, and colcothar. Examples of the antirust pigments include metal phosphate, metal molybdate, and metal borate. Examples of the fillers include inorganic fillers such as calcium carbonate, kaolin, silica, talc, barium sulfate, alumina, iron oxide, glass powder, magnesium carbonate, aluminum hydroxide, diatomaceous earth, and clay; flaky inorganic fillers such as glass flakes and mica; and fibrous inorganic fillers such as metal oxide whiskers and glass fibers.

The inorganic pigment preferably has an average particle size of 1 to 50 μm. The average particle size of the inorganic pigment can be measured with a laser diffraction particle size distribution analyzer, and is a value of the particle size at which the weight according to the particle size distribution reaches 50%.

The amount of the inorganic pigment is preferably 10 to 900 parts by mass, more preferably 300 to 800 parts by mass, still more preferably 350 to 550 parts by mass based on 100 parts by mass of the solids content of the resin in the vibration damping composite of the present invention.

The vibration damping composite of the present invention may further contain a dispersant.

Examples of the dispersant include inorganic dispersants such as sodium hexametaphosphate and sodium tripolyphosphate, and organic dispersants such as polycarboxylic acid-based dispersants.

The amount of the dispersant in terms of solids content is preferably 0.1 to 8 parts by mass, more preferably 0.5 to 6 parts by mass, still more preferably 1 to 3 parts by mass based on 100 parts by mass of the solids content of the resin in the vibration damping composite of the present invention.

The vibration damping composite of the present invention may further contain a thickener.

Examples of the thickener include polyvinyl alcohol, cellulose derivatives, and polycarboxylic acid resins.

The amount of the thickener in terms of solids content is preferably 0.01 to 5 parts by mass, more preferably 0.1 to 4 parts by mass, still more preferably 0.3 to 2 parts by mass based on 100 parts by mass of the solids content of the resin in the vibration damping composite of the present invention.

The vibration damping composite of the present invention may further contain other component(s). Examples of the other component(s) include foaming agents, solvents, organic colorants, gelling agents, defoaming agents, plasticizers, stabilizers, wetting agents, antiseptic agents, foaming inhibitors, antioxidants, mildew-proofing agents, ultraviolet absorbers, and antistatic agents. One or two or more of these may be used.

The inorganic pigment, dispersant, thickener, and the other component(s) may be mixed with the polymer emulsion according to the present invention and a cross-linking agent, for example, by means of a butterfly mixer, planetary mixer, spiral mixer, kneader, or dissolver.

Examples of the solvent include water; and organic solvents such as ethylene glycol, butyl cellosolve, butyl carbitol, and butyl carbitol acetate. The amount of the solvent may be appropriately set to adjust the solids concentration of the vibration damping composite of the present invention.

A vibration damping material which is, for example, a coating formed from the vibration damping composite of the present invention, or in particular, a vibration damping material formed by heating and drying the vibration damping composite of the present invention can have excellent appearance. As a result, the amount of a costly foaming agent (e.g. thermal expansion capsule type foaming agent), which has been used to improve the appearance, can be reduced. For example, the amount of the foaming agent in the vibration damping composite of the present invention is preferably 2% by mass or less, more preferably 1% by mass or less, most preferably 0% by mass based on 100% by mass of the entire monomer component used as a raw material of the emulsion.

<Vibration Damping Material of the Present Invention>

The present invention also relates to a vibration damping material obtainable from the vibration damping composite of the present invention.

A preferred vibration damping composite used for production of the vibration damping material of the present invention is the same as the above described preferred vibration damping composite of the present invention.

The vibration damping material of the present invention is preferably a coating (hereinafter, also referred to as vibration damping coating) with a thickness of 2 to 8 mm. In order to achieve a more sufficient vibration damping property, to prevent defects such as peeling and cracks, and to form a good coating, such a thickness is preferred. The thickness of the coating is more preferably 2 to 6 mm, still more preferably 2 to 5 mm.

A base material on which the coating is formed may be any material on which the coating can be formed, and may be, for example, a plastic material or a metal material such as a steel plate. In particular, to form a coating on the surface of a steel plate is also one preferred embodiment of the use of the vibration damping coating.

The coating can be obtained by applying the vibration damping composite of the present invention by means of, for example, brush, spatula, air spray, airless spray, mortar gun, or texture gun.

The vibration damping material of the present invention is preferably obtained by heating and drying the vibration damping composite of the present invention. The heating and drying is preferably performed such that the temperature of the coating obtained by applying the vibration damping composite to a base material is raised to preferably 40° C. to 200° C. The heating temperature is more preferably 90° C. to 180° C., still more preferably 100° C. to 160° C. Before the coating is heated and dried, it may be pre-dried at a lower temperature.

The coating is heated at the temperature for preferably 1 to 300 minutes, more preferably 2 to 250 minutes, particularly preferably 10 to 150 minutes.

The vibration damping property of the vibration damping material of the present invention can be evaluated by measuring the loss coefficient of the coating.

The loss coefficient is usually represented by $\eta$, and represents the degree of attenuation of vibration applied to the vibration damping material. The higher the loss coefficient, the better the vibration damping property.

The loss coefficient can be measured by the method disclosed in the below described examples.

The vibration damping material of the present invention exhibits a remarkably high vibration damping property in a wide temperature range and has excellent appearance, and is therefore preferably usable for transportation such as vehicles, railway vehicles, ships, and aircraft, electric devices, buildings, and construction machinery.

The present invention also relates to use of a resin composition containing a lignin and/or a lignin derivative as a vibration damping property-imparting agent used in a coating material for a vibration damping coating.

The present invention also relates to use of a resin composition containing a lignin and/or a lignin derivative as a film-forming property improver used in a coating material for a coating. The film-forming property refers to the ability to prevent a coating from being peeled from a base material or cracked.

The present invention also relates to use of a formulation containing a resin composition that contains a lignin and/or a lignin derivative and an inorganic pigment as a coating material for a vibration damping coating.

The present invention also relates to use of a coating, as a vibration damping material, formed from a formulation that contains a resin composition containing a lignin and/or a lignin derivative and an inorganic pigment.

The preferred constitutions of the resin composition, the formulation, and the coating are the same as the above described preferred constitutions of the resin composition for vibration damping materials, the vibration damping composite, and the vibration damping coating.

Advantageous Effects of Invention

The resin composition for vibration damping materials of the present invention containing a lignin and/or a lignin derivative, which is readily available at low cost, is capable of providing a vibration damping material that can exhibit a remarkably high vibration damping property in a wide temperature range and can have excellent appearance.

DESCRIPTION OF EMBODIMENTS

The following description is offered to demonstrate the present invention based on embodiments of the present invention. The embodiments should not be construed as limiting the present invention. Unless otherwise mentioned, the term “part(s)” means “part(s) by weight” and “%” means “% by mass”.

The properties were evaluated as follows in the production examples.

<Average Particle Size>

The average particle size of emulsion particles was measured by dynamic light scattering using a particle size distribution analyzer (FPAR-1000, Otsuka Electronics Co., Ltd.).

<Nonvolatile Content (N.V.)>

About 1 g of an obtained emulsion was weighed, and dried in a hot air dryer at 150° C. for one hour. The residue amount after drying was measured as the nonvolatile content and expressed as % by mass relative to the mass before drying.

<pH>

The pH at 25° C. was measured using a pH meter (“F-23” produced by Horiba, Ltd.).

<Viscosity>

The viscosity was measured at 25° C. and 20 rpm using a B type rotary viscometer (“VISCOMETER TUB-10” produced by Toki Sangyo Co., Ltd.).

<Weight Average Molecular Weight>

The weight average molecular weight was measured by gel permeation chromatography (GPC) under the following conditions.

Measuring equipment: HLC-8120GPC (trade name, produced by Tosoh Corporation)

Molecular-weight column: TSK-GEL GMHXL-L and TSK-GEL G5000HXL (both produced by Tosoh Corporation) connected in series Eluent: Tetrahydrofuran (THF)

Calibration curve reference material: Polystyrene (produced by Tosoh Corporation)

Measuring method: A measurement object was dissolved in THF to a solids content of about 0.2% by mass, and the resulting solution was filtered through a filter. The filtrate was used as a measurement sample, and the molecular weight thereof was measured.

<Glass Transition Temperature (Tg) of Polymer>

The Tg of the polymer was calculated from the following formula (1) based on the compositions of the monomers used in the stages.

$$\frac{1}{Tg'} = \left[\frac{W_1'}{T_1} + \frac{W_2'}{T_2} + \ldots + \frac{W_n'}{T_n}\right] \tag{1}$$

In the equation, Tg' represents Tg (absolute temperature) of a polymer; $W_1'$, $W_2'$, . . . , and Wn' each represent a mass fraction of each monomer relative to the entire monomer component; and $T_1$, $T_2$, . . . , and Tn each represent a glass transition temperature (absolute temperature) of the homopolymer of each monomer.

The Tg calculated from the compositions of the monomers in all the stages was expressed as “total Tg”. The following shows the glass transition temperatures (Tg) of the homopolymers of the respective polymerizable monomers which were used to calculate the Tg based on the formula (1).

Methyl methacrylate (MMA): 105° C.

2-Ethylhexyl acrylate (2EHA): −70° C.

Butyl acrylate (BA): −56° C.

Acrylic acid (AA): 95° C.

Styrene (St): 100° C.

<Production Examples of Polymer Emulsion, and so Forth>

Production Example 1

A polymerization vessel equipped with a stirrer, a reflux condenser, a thermometer, a nitrogen inlet tube, and a dropping funnel was charged with deionized water (180.3 parts). Then, the internal temperature was increased to 75° C. under stirring and nitrogen flow. The dropping funnel was charged with a monomer emulsion composed of methyl methacrylate (505 parts), 2-ethylhexyl acrylate (135.0 parts), butyl acrylate (350 parts), acrylic acid (10.0 parts), t-dodecyl mercaptan (4.0 parts) as a polymerization chain transfer agent, NEWCOL 707SF (trade name, ammonium polyoxyethylene polycyclic phenyl ether sulfate: produced by Nippon Nyukazai Co., Ltd.) (180.0 parts) adjusted to a 20% aqueous solution in advance, and deionized water (164.0 parts). While the internal temperature of the polymerization vessel was maintained at 75° C., a 27.0-part portion of the monomer emulsion, a 5% potassium persulfate aqueous solution (5 parts), and a 2% sodium hydrogen sulfite aqueous solution (10 parts) as a polymerization initiator (oxidant) were added to start initial polymerization. After 40 minutes, the rest of the monomer emulsion was uniformly added dropwise over 210 minutes with the reaction system being maintained at 80° C. Simultaneously, a 5% potassium persulfate aqueous solution (95 parts) and a 2% sodium hydrogen sulfite aqueous solution (90 parts) were uniformly added dropwise over 210 minutes. After the completion of the dropwise addition, the temperature was maintained for 60 minutes to complete the polymerization.

The resulting reaction solution was cooled to room temperature, and 2-dimethylethanolamine (16.7 parts) was added. Thus, acrylic emulsion particles 1 which had a nonvolatile content of 60.1%, a pH of 8.1, a viscosity of 2,600 mPa·s, an average particle size of 260 nm (particle size distribution 24%), and a weight average molecular weight of 49,000 were obtained.

Production Example 2

A polymerization vessel equipped with a stirrer, a reflux condenser, a thermometer, a nitrogen inlet tube, and a dropping funnel was charged with deionized water (180.3 parts). Then, the internal temperature was increased to 75° C. under stirring and nitrogen flow. The dropping funnel was charged with a monomer emulsion composed of styrene (170 parts), methyl methacrylate (343 parts), 2-ethylhexyl acrylate (170 parts), butyl acrylate (307 parts), acrylic acid (10.0 parts), t-dodecyl mercaptan (4.0 parts) as a polymerization chain transfer agent, NEWCOL 707SF (trade name, ammonium polyoxyethylene polycyclic phenyl ether sulfate: produced by Nippon Nyukazai Co., Ltd.) (180.0 parts) adjusted to a 20% aqueous solution in advance, and deionized water (164.0 parts). While the internal temperature of the polymerization vessel was maintained at 75° C., a 27.0-part portion of the monomer emulsion, a 5% potassium persulfate aqueous solution (5 parts), and a 2% sodium hydrogen sulfite aqueous solution (10 parts) as a polymerization initiator (oxidant) were added to start initial polymerization. After 40 minutes, the rest of the monomer emulsion was uniformly added dropwise over 210 minutes with the reaction system being maintained at 80° C. Simultaneously, a 5% potassium persulfate aqueous solution (95 parts) and a 2% sodium hydrogen sulfite aqueous solution (90 parts) were uniformly added dropwise over 210 minutes. After the completion of the dropwise addition, the temperature was maintained for 60 minutes to complete the polymerization.

The resulting reaction solution was cooled to room temperature, and 2-dimethylethanolamine (16.7 parts) was added. Thus, acrylic emulsion particles 2 which had a nonvolatile content of 59.9%, a pH of 8.0, a viscosity of 1,800 mPa·s, an average particle size of 240 nm (particle size distribution 27%), and a weight average molecular weight of 48,000 were obtained.

Production Example 3

A polymerization vessel equipped with a stirrer, a reflux condenser, a thermometer, a nitrogen inlet tube, and a dropping funnel was charged with deionized water (174.1 parts). Then, the internal temperature was increased to 75° C. under stirring and nitrogen flow. The dropping funnel was charged with a monomer emulsion of a first step which was composed of styrene (165 parts), methyl methacrylate (160 parts), 2-ethylhexyl acrylate (165 parts), acrylic acid (10 parts), t-dodecyl mercaptan (3 parts) as a polymerization chain transfer agent, LEVENOL WZ (trade name, produced by Kao Corporation) (90.0 parts) adjusted to a 20% aqueous solution in advance, and deionized water (82 parts). While the internal temperature of the polymerization vessel was maintained at 80° C., a 8-part portion of the monomer emulsion, a 5% potassium persulfate aqueous solution (5 parts), and a 2% sodium hydrogen sulfite aqueous solution (10 parts) as a polymerization initiator (oxidant) were added to start initial polymerization. After 20 minutes, the rest of the monomer emulsion was uniformly added dropwise over 120 minutes with the reaction system being maintained at 80° C. Simultaneously, a 5% potassium persulfate aqueous solution (50 parts) and a 2% sodium hydrogen sulfite aqueous solution (50 parts) were uniformly added dropwise over 120 minutes. After the completion of the dropwise addition, the temperature was maintained for 60 minutes. The dropping funnel was then charged with a monomer emulsion of a second step which was composed of styrene (100 parts), methyl methacrylate (100 parts), butyl acrylate (205 parts), 2-ethylhexyl acrylate (85 parts), acrylic acid (10 parts), t-dodecyl mercaptan (3 parts), LEVENOL WZ (trade name, produced by Kao Corporation) (90.0 parts) adjusted to a 20% aqueous solution in advance, and deionized water (82 parts). The monomer emulsion was uniformly added dropwise into the reaction solution over 120 minutes. Simultaneously, a 5% potassium persulfate aqueous solution (50 parts) and a 2% sodium hydrogen sulfite aqueous solution (50 parts) were uniformly added dropwise over 120 minutes. After the completion of the dropwise addition, the temperature was maintained for 90 minutes to complete the polymerization. The resulting reaction solution was cooled to room temperature, and 25% ammonia water (10 parts) was added. Thus, acrylic emulsion 3 which had a nonvolatile content of 59.8%, a pH of 8.0, a viscosity of 3,000 mPa·s, an average particle size of 260 nm, a weight average molecular weight of 65,000, a Tg of the first step of 20.1° C., a Tg of the second step of −13° C., and a total Tg of 1.6° C. was obtained.

The following shows the trade names and details of the polymer emulsions used in the below described Examples 11 and 12 and Comparative Examples 4 and 5.

<SBR>

SR-110 (produced by Nippon A&L Inc., styrene-butadiene resin, Tg: −20° C., nonvolatile content: 50%, SP value: 8.7)

<Vinyl Acetate>

Polysol for adhesion-1000J (produced by Showa Denko K.K., vinyl acetate resin, nonvolatile content: 51%)

<Production Examples of a Lignin>

(KP Liquor)

Kraft pulp waste liquor was condensed so that the solids concentration was adjusted to 30% by mass.

(SP Liquor)

Sulfite pulp waste liquor was condensed so that the solids concentration was adjusted to 30% by mass.

(Sodium Lignosulfonate Liquid)

PEARLLEX NP (produced by Nippon Paper Industries Co., Ltd.) was dissolved in water so that the solids concentration was adjusted to 30% by mass.

(Magnesium Lignosulfonate Liquid)

San X P321 (produced by Nippon Paper Industries Co., Ltd.) was dissolved in water so that the solids concentration was adjusted to 30% by mass.

(Calcium Lignosulfonate Liquid)

PEARLLEX CP (Nippon Paper Industries Co., Ltd.) was dissolved in water so that the solids concentration was adjusted to 30% by mass.

<Production Example of Lignin Derivative>

Production Example 4

A glass reaction vessel equipped with a thermometer, a stirrer, a reflux condenser, a nitrogen inlet tube, and a dropping device was charged with water (300 parts), methoxypolyethylene glycol acrylate (Light acrylate 130A, produced by Kyoeisha Chemical Co., Ltd.) (40 g), acrylic acid (15 g), PEARLLEX NP (sodium lignosulfonate, produced by Nippon Paper Chemicals Co., Ltd.) (144 g), and t-dodecylmercaptan (0.5 g), and the temperature of the solution was increased to 100° C. under a nitrogen atmosphere. After the contents were stirred for 30 minutes, a 20% hydrogen peroxide aqueous solution (2 g) was continually added dropwise to the reaction vessel over 10 minutes. Immediately thereafter, dropwise addition of an aqueous solution (20 g) containing L-ascorbic acid (0.2 g) was started. The contents were reacted for one hour while the temperature was maintained at 100° C., and the reaction product was then mixed with water (147 g) and stirred. Thus, an aqueous solution of a lignin derivative with a solids content of 30% was obtained.

Examples 1 to 13, Comparative Examples 1 to 5

Example 1

The emulsion 1 (80 parts) obtained in Production Example 1 was mixed with a lignin (KP liquor) (20 parts) and deionized water (20 parts) to prepare an emulsion-lignin blend (resin composition) 1 with a solids concentration of 45% by mass.

Examples 2 to 13, Comparative Examples 1 to 5

Emulsion-lignin blends 2 to 18 were obtained as in Example 1, except that the kind and/or the amount of emulsion, a lignin, a lignin derivative, and/or deionized water were/was changed according to Table 1. In Comparative Examples 1 to 5, neither a lignin nor a lignin derivative was blended.

<Preparation of Vibration Damping Composite>

The emulsion-lignin blends 1 to 13 in Examples 1 to 13 and the emulsion-lignin blends 14 to 18 in Comparative Examples 1 to 5 were each blended as described below, and thereby vibration damping composites were prepared. The properties were evaluated as follows. Table 1 shows the results.

Emulsion-lignin blends 1 to 18: 359 parts

Calcium carbonate NN#200*1: 620 parts

Dispersant AQUALIC DL-40S*2: 6 parts

Thickener ACRYSET WR-650*3: 4 parts

*1: Filler produced by Nitto Funka Kogyo K.K.

*2: Polycarboxylic acid-based dispersant (active component: 44%) produced by Nippon Shokubai Co., Ltd.

*3: Alkali-soluble acrylic thickener (active component: 30%) produced by Nippon Shokubai Co., Ltd.

The following shows the methods for evaluation of the properties.

Coatings formed from the vibration damping composites obtained in the examples and comparative examples were evaluated for their appearance and tested for their vibration damping properties by the following methods. Table 1 shows the results.

<Evaluation of Appearance of Coating>

Each vibration damping composite was applied to a steel plate (trade name: SPCC-SD, 75 mm in width×150 mm in length×0.8 mm in thickness, produced by Nippon Testpanel Co., Ltd.) so that the formulation had a thickness of 4 mm, and dried in a hot air dryer at 150° C. for 50 minutes. The condition of the surface of the resulting dry coating was evaluated using the following criteria.

Good: No defect

Fair: The coating was partly peeled from the base material or cracked.

Bad: Peeling or cracking was observed throughout the coating.

<Vibration Damping Property Test>

Each vibration damping composite was applied to a cold rolled steel plate (trade name: SPCC, 15 mm in width×250 mm in length×1.5 mm in thickness, produced by Nippon Testpanel Co., Ltd.) so that the formulation had a thickness of 3 mm, and dried at 150° C. for 30 minutes. Thus, a vibration damping coating with a surface density of 4.0 kg/m$^2$ was formed on the cold rolled steel plate.

The vibration damping property was measured by evaluating the loss coefficients at particular temperatures (20° C., 30° C., 40° C., 50° C., and 60° C.) by a cantilever method (loss coefficient measurement system produced by Ono Sokki Co., Ltd.). The vibration damping property was evaluated based on the total loss coefficient (the sum of loss coefficients at 20° C., 30° C., 40° C., 50° C., and 60° C.). A larger total loss coefficient corresponds to a higher vibration damping property.

| | | Example 1 | Example 2 | Example 3 | Example 4 | Example 5 | Example 6 | Example 7 |
|---|---|---|---|---|---|---|---|---|
| Resin | Production Example 1 | 80 | 80 | — | — | — | — | — |
| | Production Example 2 | — | — | 80 | 60 | 80 | 80 | 80 |
| | Production Example 3 | — | — | — | — | — | — | — |
| | SER (SR-110) | — | — | — | — | — | — | — |
| | Vinyl acetate (Polysol 1000J) | — | — | — | — | — | — | — |
| Lignin | KP liquor | 20 | — | 20 | 40 | — | — | — |
| | SP liquor | — | 20 | — | — | 20 | — | — |
| | Sodium lignosulfonate liquid | — | — | — | — | — | 20 | — |
| | Magnesium lignosulfonate liquid | — | — | — | — | — | — | 20 |
| | Calcium lignosulfonate liquid | — | — | — | — | — | — | — |
| | Lignin derivative (Production Example 4) | — | — | — | — | — | — | — |
| Water | | 20 | 20 | 20 | 6.7 | 20 | 20 | 20 |
| Appearance | | Good | Good | Good | Good | Good | Good | Good |
| Vibration damping property | 20° C. | 0.084 | 0.081 | 0.082 | 0.078 | 0.079 | 0.077 | 0.081 |
| | 30° C. | 0.126 | 0.118 | 0.137 | 0.108 | 0.128 | 0.127 | 0.136 |
| | 40° C. | 0.088 | 0.096 | 0.081 | 0.128 | 0.091 | 0.093 | 0.097 |
| | 50° C. | 0.061 | 0.071 | 0.046 | 0.086 | 0.054 | 0.058 | 0.062 |
| | 60° C. | 0.024 | 0.028 | 0.019 | 0.042 | 0.026 | 0.031 | 0.034 |
| | Total | 0.383 | 0.394 | 0.365 | 0.442 | 0.378 | 0.386 | 0.41 |

| | | Example 8 | Example 9 | Example 10 | Example 11 | Example 12 | Example 13 |
|---|---|---|---|---|---|---|---|
| Resin | Production Example 1 | — | — | — | — | — | — |
| | Production Example 2 | 60 | 80 | — | — | 62.3 | 80 |
| | Production Example 3 | — | — | 80 | — | — | — |
| | SER (SR-110) | — | — | — | 96 | — | — |
| | Vinyl acetate (Polysol 1000J) | — | — | — | — | 20.8 | — |
| Lignin | KP liquor | — | — | 20 | 20 | 20 | — |
| | SP liquor | — | — | — | — | — | — |
| | Sodium lignosulfonate liquid | — | — | — | — | — | — |
| | Magnesium lignosulfonate liquid | 40 | — | — | — | — | — |
| | Calcium | — | 20 | — | — | — | — |

-continued

| | | | | | | | |
|---|---|---|---|---|---|---|---|
| | lignosulfonate liquid | | | | | | |
| | Lignin derivative (Production Example 4) | — | — | — | — | — | 20 |
| Water | | 6.7 | 20 | 20 | 4 | 16.9 | 20 |
| Appearance | | Good | Good | Good | Fair | Good | Good |
| Vibration damping property | 20° C. | 0.08 | 0.078 | 0.071 | 0.068 | 0.064 | 0.076 |
| | 30° C. | 0.139 | 0.126 | 0.119 | 0.062 | 0.114 | 0.117 |
| | 40° C. | 0.113 | 0.096 | 0.121 | 0.041 | 0.071 | 0.097 |
| | 50° C. | 0.076 | 0.061 | 0.069 | 0.022 | 0.035 | 0.066 |
| | 60° C. | 0.042 | 0.033 | 0.031 | 0.011 | 0.018 | 0.041 |
| | Total | 0.45 | 0.394 | 0.411 | 0.204 | 0.302 | 0.397 |

| | | Comparative Example 1 | Comparative Example 2 | Comparative Example 3 | Comparative Example 4 | Comparative Example 5 |
|---|---|---|---|---|---|---|
| Resin | Production Example 1 | 100 | — | — | — | — |
| | Production Example 2 | — | 100 | — | — | 75 |
| | Production Example 3 | — | — | 100 | — | — |
| | SER (SR-110) | — | — | — | 100 | — |
| | Vinyl acetate (Polysol 1000J) | — | — | — | — | 25 |
| Lignin | KP liquor | — | — | — | — | — |
| | SP liquor | — | — | — | — | — |
| | Sodium lignosulfonate liquid | — | — | — | — | — |
| | Magnesium lignosulfonate liquid | — | — | — | — | — |
| | Calcium lignosulfonate liquid | — | — | — | — | — |
| | Lignin derivative (Production Example 4) | — | — | — | — | — |
| Water | | 33.3 | 33.3 | 33.3 | 13.3 | 26.3 |
| Appearance | | Bad | Fair | Fair | Bad | Bad |
| Vibration damping property | 20° C. | 0.114 | 0.102 | 0.091 | 0.061 | 0.081 |
| | 30° C. | 0.128 | 0.132 | 0.14 | 0.043 | 0.109 |
| | 40° C. | 0.068 | 0.061 | 0.092 | 0.022 | 0.051 |
| | 50° C. | 0.024 | 0.019 | 0.03 | 0.018 | 0.017 |
| | 60° C. | 0.019 | 0.011 | 0.016 | 0.009 | 0.011 |
| | Total | 0.353 | 0.325 | 0.369 | 0.151 | 0.269 |

The comparison of Examples 1 and 2 with Comparative Example 1 in which the emulsion obtained in Production Example 1 was used demonstrates that a higher vibration damping property and better appearance were obtained in Examples 1 and 2 because a KP liquor was used in Example 1 and a SP liquor was used in Example 2. The comparison of Examples 3 to 9 and 13 with Comparative Example 2 in which the emulsion obtained in Production Example 2 was used demonstrates that a higher vibration damping property and better appearance were obtained in Examples 3 to 9 and 13 because a KP liquor was used in Examples 3 and 4, a SP liquor was used in Example 5, each of the lignosulfonates was used in Examples 6 to 9, and a lignin derivative was used in Example 13. The comparison of Example 10 with Comparative Example 3 in which the emulsion obtained in Production Example 3 was used demonstrates that a higher vibration damping property and better appearance were obtained because a KP liquor was used in Example 10. The comparison of Example 11 with Comparative Example 4 in which a styrene-butadiene resin was used demonstrates that a higher vibration damping property and better appearance were obtained because a KP liquor was used in Example 11. The comparison of Example 12 with Comparative Example 5 in which the emulsion obtained in Production Example 2 and a vinyl acetate resin were used in combination demonstrates that a higher vibration damping property and better appearance were obtained in Example 12 because a KP liquor was used in Example 12.

As described above, the comparisons of the examples with the corresponding comparative examples (in which the same resins as in the examples were used) demonstrate that a higher vibration damping property and better appearance were obtained in all the examples in which the vibration damping composite contains a lignin and/or a lignin derivative. In particular, the vibration damping material coatings in the examples have sufficiently good appearance in which generation of peeling and cracks is suppressed even without containing a foaming agent. This demonstrates remarkably high effects of improving the appearance of the present invention. Accordingly, the results of the examples show that the present invention can be employed in the entire technical field of the present invention and in the various embodiments disclosed herein, and can exhibit advantageous effects.

The invention claimed is:

1. A vibration damping composite comprising:

a resin composition comprising:

a lignin and/or a lignin derivative, a resin, and an aqueous solvent, in the resin composition, the resin being dispersed or dissolved in the aqueous solvent, the resin including at least one polymer selected from the group consisting of (meth)acrylic polymers, diene polymers, and vinyl acetate polymers; and an inorganic pigment, wherein the (meth)acrylic polymers are prepared by copolymerization of 0.1% to 5% by mass of (meth)acrylic acid monomer and 95% to 99.9% by mass of another copolymerizable unsaturated monomer, wherein said another copolymerizable unsaturated monomer is a (meth)acrylic monomer other than the (meth)acrylic acid monomer, or is an unsaturated monomer including an aromatic ring.

2. The vibration damping composite according to claim 1, wherein the (meth)acrylic polymer is a styrene-(meth) acrylic polymer obtained from a monomer component containing styrene.

3. The vibration damping composite according to claim 1, wherein the resin includes an emulsion prepared by emulsion polymerization of a monomer component.

4. The vibration damping composite according to claim 1, wherein the solids content of the (meth)acrylic polymer is 20% by mass or more of 100% by mass of the solids content of the resin composition for vibration damping materials.

5. The vibration damping composite according to claim 1, wherein the solids content of the (meth)acrylic polymer is 99% by mass or less of 100% by mass of the solids content of the resin composition for vibration damping materials.

6. The vibration damping composite according to claim 1, wherein the (meth)acrylic polymer has a weight average molecular weight of 20,000 to 800,000.

7. The vibration damping composite according to claim 1, wherein the (meth)acrylic polymer has a glass transition temperature of −20° C. to 40° C.

8. The vibration damping composite according to claim 3, wherein the emulsion contains emulsion particles having an average particle size of 80 to 450 nm.

9. The vibration damping composite according to claim 1, wherein the lignin is a lignin sulfonic acid (salt).

10. The vibration damping composite according to claim 1, wherein the lignin derivative has a structure represented by the following formula (1):

(1)

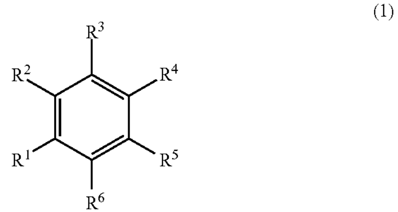

wherein $R^1$ to $R^6$ are the same as or different from one another, and each represent a hydrogen atom, a hydroxy group, an alkoxy group, an acyl group, an amino group, a sulfonic acid group, a sulfonate group, a carboxyl group-containing group, a (poly)alkylene glycol chain-containing group, a hydrocarbon group, a direct bond or a thioether bond to a structure derived from another phenylpropane skeleton; at least one of $R^1$ to $R^6$ represents a direct bond or a thioether bond to a structure derived from another phenylpropane skeleton; and at least one of $R^1$ to $R^6$ represent an alkoxy group, a carboxyl group-containing group, a (poly)alkylene glycol chain-containing group, or a hydrocarbon group.

11. The vibration damping composite according to claim 1, wherein the lignin and/or the lignin derivative have/has a weight average molecular weight of 100 to 40,000.

12. The vibration damping composite according to claim 1, wherein the amount of the lignin and/or the lignin derivative is 1% by mass or more of 100% by mass of the solids content of the resin composition for vibration damping materials.

13. The vibration damping composite according to claim 1, wherein the amount of the lignin and/or the lignin derivative is 80% by mass or less of 100% by mass of the solids content of the resin composition for vibration damping materials.

14. The vibration damping composite according to claim 1, wherein the amount of the aqueous solvent is 3% by mass or more of 100% by mass of the resin composition for vibration damping materials.

15. The vibration damping composite according to claim 1, wherein the amount of the aqueous solvent is 97% by mass or less of 100% by mass of the resin composition for vibration damping materials.

16. The vibration damping composite of claim 1, wherein the vibration damping composite is a coating material.

17. The vibration damping composite of claim 1, wherein the resin composition comprises an emulsion prepared by emulsion polymerization.

18. The vibration damping composite of claim 1, wherein the lignin and/or lignin derivative is present in an amount of 7% by mass or more of 100% by mass of the solids content of the resin composition for vibration damping materials.

19. The vibration damping composite of claim 1, wherein the inorganic pigment is present in an amount within a range from 300 to 800 parts by mass per 100 parts by mass of the solids content of the resin.

* * * * *